United States Patent
Potter et al.

(10) Patent No.: US 7,555,786 B2
(45) Date of Patent: Jun. 30, 2009

(54) METHOD FOR PROVIDING SECURITY MECHANISMS FOR DATA WAREHOUSING AND ANALYSIS

(75) Inventors: Charles M. Potter, Nepean (CA); Glen M. Seeds, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 10/835,526

(22) Filed: Apr. 29, 2004

(65) Prior Publication Data
US 2005/0022029 A1    Jan. 27, 2005

(30) Foreign Application Priority Data
Apr. 29, 2003    (CA)    ................................ 2427182

(51) Int. Cl.
    G06F 17/30    (2006.01)
(52) U.S. Cl. .................. 726/30; 707/9; 726/2
(58) Field of Classification Search ............. None
    See application file for complete search history.

(56) References Cited

U.S. PATENT DOCUMENTS

| | | | |
|---|---|---|---|
| 4,454,576 A | 6/1984 | Adam et al. | |
| 5,893,125 A | 4/1999 | Shostak | |
| 5,903,859 A | 5/1999 | McReynolds et al. | |
| 6,003,036 A | 12/1999 | Martin | |
| 6,411,961 B1 | 6/2002 | Chen | |
| 6,581,068 B1 | 6/2003 | Bensoussan et al. | |
| 6,658,627 B1 | 12/2003 | Gallup et al. | |
| 6,738,762 B1 | 5/2004 | Chen et al. | |
| 6,847,962 B1 | 1/2005 | Cochrane et al. | |
| 6,996,566 B1 | 2/2006 | George et al. | |
| 6,999,977 B1 | 2/2006 | Norcott et al. | |
| 7,139,755 B2 | 11/2006 | Hammond | |
| 7,185,192 B1* | 2/2007 | Kahn | 713/155 |
| 2003/0088558 A1 | 5/2003 | Zaharioudakis et al. | |
| 2003/0154277 A1 | 8/2003 | Haddad et al. | |
| 2004/0015470 A1* | 1/2004 | Smith et al. | 707/1 |
| 2004/0015489 A1 | 1/2004 | Anonsen et al. | |
| 2004/0039729 A1 | 2/2004 | Boger et al. | |
| 2004/0249810 A1 | 12/2004 | Das et al. | |
| 2004/0268306 A1 | 12/2004 | Cheng et al. | |
| 2005/0004911 A1 | 1/2005 | Goldberg et al. | |

FOREIGN PATENT DOCUMENTS

EP    0 413 486    2/1991

* cited by examiner

*Primary Examiner*—Brandon S Hoffman
(74) *Attorney, Agent, or Firm*—Shumaker & Sieffert, P.A.

(57) ABSTRACT

The present invention discloses a method for using a relational database management system to support on-line analytical processing (OLAP) systems by providing a security access mechanism. The method of restricting access to data contained in a business intelligence system, comprises the steps of defining one or more security roles, associating the security roles with business intelligence data, selecting one or more security roles from the one or more security roles, combining the one or more security filters with a data access language statement, and interpreting the data access statement.

8 Claims, 3 Drawing Sheets

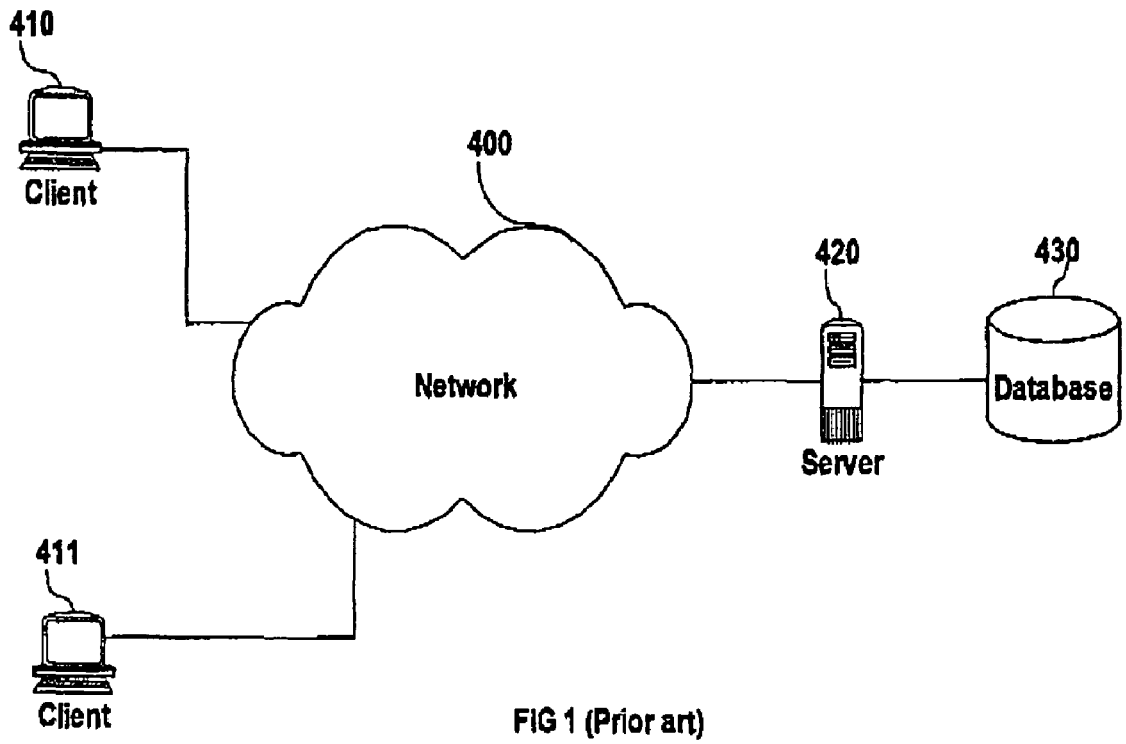
FIG 1 (Prior art)
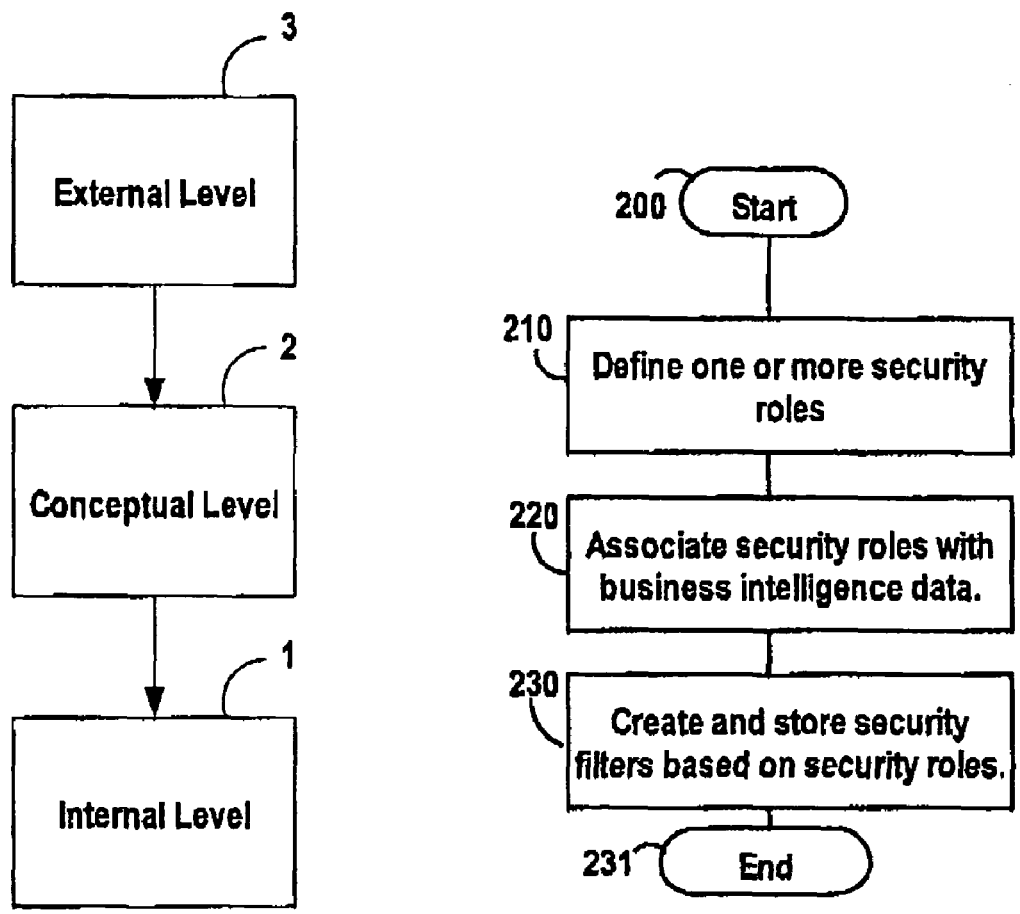
FIG 2 (Prior art)
FIG 3

METHOD FOR PROVIDING SECURITY MECHANISMS FOR DATA WAREHOUSING AND ANALYSIS

FIELD OF THE INVENTION

The invention relates to systems and methods of data warehousing and analysis, and in particular to a system and method for providing security mechanisms suitable for business intelligence applications.

BACKGROUND

Disclosure of private or business-critical information can compromise an enterprise. Information disclosure threats expose information to individuals who are not supposed to see it. A user's ability to read a file to which she or he was not granted access is an example of a disclosure threat. Typical security systems rely on specifying the right of access to data based on membership of a particular security rights group. In some cases, the group membership is limited to one person. This approach means that it is complex to set up and maintain such security. Consequently, the security of access is often over-simplified, and in some cases ignored altogether in order to achieve the required data access for those who need it. What is needed is the ability to simplify the setting up and maintaining of security processes so that there is no disincentive to provide the desired security.

U.S. Pat. No. 6,662,188 "Metadata model", Rasmussen, et al. issued Dec. 9, 2003, hereby incorporated by reference, describes a three level abstraction model for use in business intelligence environments. This is briefly described with reference to FIG. 2.

The lowest level in the database abstraction is the internal level 1. In the internal level 1, the database is viewed as a collection of files organized according to an internal data organization. The internal data organization may be anyone of several possible internal data organizations, such as B+-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the Database Management System (DBMS). When the data structure or file organization of the database is changed, the internal level 1 is also changed. When changes to the internal level 1 do not affect the conceptual level 2 and external level 3, the DBMS is said to provide for physical data independence. When changes to the conceptual level 2 do not affect the external level 3, the DBMS is said to provide for logical data independence.

A typical DBMS uses a data model to describe the data and its structure, data relationships, and data constraints in the database. Some data models provide a set of operators that are used to update and query the database. DBMSs may be classified as either record-based systems or object-based systems. Both types of DBMSs use a data model to describe databases at the conceptual level 2 and external level 3.

Data models may also be called metadata models as they store metadata, i.e., data about (or describing) data in databases.

The previous invention, "Metadata Model—Rasmussen, et al", describes a data model or metadata model which realizes the three abstraction levels and provides information that can be shared by multiple users who use different business intelligence tools or client applications.

This is done by providing a metadata model that defines model objects to represent one or more data sources. The metadata model comprises a data access layer, a business layer and a package layer. The data access layer contains data access model objects. The data access model objects include a data access model object that describes how to retrieve data from the data sources. The business layer contains business model objects. The business model objects include a business model object that describes a business view of data in the data sources. The package layer contains package model objects. The package model objects include a package model object that references a subset of business model objects.

It also provides for a metadata model to contain model objects representing one or more data sources. The data sources contain tables having columns. The metadata model comprises a data access layer, a business layer and a package layer. The data access layer contains data access model objects. The data access model objects include table objects that describe definitions of the tables contained in the data sources, and column objects that describe definitions of the columns of the tables contained in the data sources. The business layer contains business model objects. The business model objects include entities that are constructed based on the table objects in the data access layer, and attributes that are constructed based on the column objects in the data access layer. The package layer contains package model objects. The package model objects include a package model object that references a subset of the business model objects.

The applicant's co-pending application "Simplified Metadata Model for Reporting", Potter et al, hereby incorporated by reference, modifies the metadata model by combining the data access layer and business layer of the previous invention and providing a new combined element, the query layer. This is possible because the entities and attributes used in defining the model have been replaced by the more powerful concepts of query subjects and query items. In other respects the operation is similar to the earlier invention. However, now when a database schema is imported, the system creates within the query layer a set of unified database query subjects that are directly tied to the underlying database, and are also directly usable in creating reports. This set of objects bring together all of the abstraction and mapping that the previous invention (Metadata Modeling) handled with 'connections' between physical and logical segments of the model. In contrast to a 'view', which is defined by the database administrator DBA, a query subject is abstracted and separate from the underlying database, is applicable to and able to translate different kinds of databases, and provides a translation of the data and metadata into the terminology of the user.

The query layer includes metadata that describes how to retrieve physical data from data sources. It is used to formulate and refine queries against the underlying data sources. The query layer contains those model objects that directly describe actual physical data in the data sources and their relationships. These model objects are called query subjects, and they in turn contain query items, which are attributes and relate the columns of the underlying databases. The query subjects may include, among other things, databases, catalogues, schemas, tables, files, columns, data access keys, indexes and data access joins, as well as Structured Query Language (SQL) code that assists in the transformation of the data. Each query subject has one or more columns. Typically, data access joins exist between query subjects. The query subjects in the query layer may be thought of as extended metadata, created as a result of importing metadata from data sources and metadata sources provided by users. The information of some data access objects may be available from the underlying data sources. The user can customize some objects in the query layer in order to create data access joins, i.e., relationships between objects that were imported from various data sources.

The query layer also describes the business view of the physical data in the underlying data sources. It is used to provide business abstractions of the physical data with which the query engine can formulate queries against the underlying data sources. Thus the query layer contains information encapsulated in the query subjects and query items that can be used to define in abstract terms the user's business entities and their inter-relationships. These query subjects are reusable objects that represent the concepts and structure of the business to be used in business intelligence environments. They present a single unified business model, with direct relationships to the underlying databases, and can be related to physical data in a number of different data sources. The query layer also includes business rules and display rules. As well as query subjects and query items, the query layer may include keys and joins. Since the query subjects within the query layer have the ability to incorporate SQL, they may be used directly in creating reports.

One of the most significant problems of providing data security at the modelling level is how to specify security flexibly, while minimising the complexity of maintenance. Other systems make use of the limited security provided through the DBMS.

SUMMARY

In one aspect the invention provides a method of ensuring restricted access to data contained in a business intelligence system using a database and having an application with user input, by defining one or more security roles, associating the one or more security roles with business intelligence data stored in the database, deriving one or more security filters from the security roles and storing the one or more security filters, selecting for a user requiring a report the one or more user security roles from the stored one or more security roles and thereby selecting one or more user security filters from the one or more related security filters, accepting, from the user requiring the report, input defining an original data access language statement, to determine the information required to be selected from the database, combining the stored one or more related security filters with the original data access language statement to produce a modified data access statement, to limit the data accessed by the data access statement in accordance with the previously selected security roles, accessing the data stored with the database by interpreting the modified data access statement and presenting the user requiring the report with business intelligence data accessed by the modified data access statement.

Advantages of the invention include the ability to reuse filters, each of which is defined and maintained separately. For example, a high-level filter is first defined that describes a large base subset of data available to the union of all groups in question (e.g. a country). Individual group filters are then defined that refine this with the specifics of each group (e.g. product lines), without having to re-describe the base subset. When the two filters are combined, it is apparent that the resultant data pertains in this case to the country and product line in question. Re-use is also enhanced by allowing complex filters to be defined and maintained in a free-standing location, and referenced in those locations described above.

One example of a security loophole occurs where there are filters for groups A and B. When a user belongs to both of these groups they can then see the data for both groups. If a system administrator removes the user from group B, they can see less data—just that for group A. If the user is removed from group B, the natural viewpoint says that they should not be able to see any data. However if an implementation applies no filters in this case, they will see everything, which is probably the opposite of the administrator's intent.

The invention provides for ways to handle security, in both databases and data warehouses, that is easy to understand, and is not subject to subtle and inadvertent security loopholes.

One of the most significant problems of providing data security at the modelling level is how to specify security in ways that can be assembled as building blocks. The invention ensures that information does not need to be repeated when going to different levels of refinement, across different user communities. In addition, the invention does not rely solely on the security mechanisms of the underlying database, but rather achieves its goals based on a separate security database associated through being part of the metadata model.

BRIEF DESCRIPTION OF THE DRAWINGS

The invention is described with reference to the following drawings:

FIG. 1 shows a computer network suitable for carrying out embodiments of the invention FIG. 2 is a diagram showing an example of database abstractions;

FIG. 3 shows an outline flowchart describing one part of an embodiment of the invention.

DETAILED DESCRIPTION OF THE INVENTION

Figure 4:
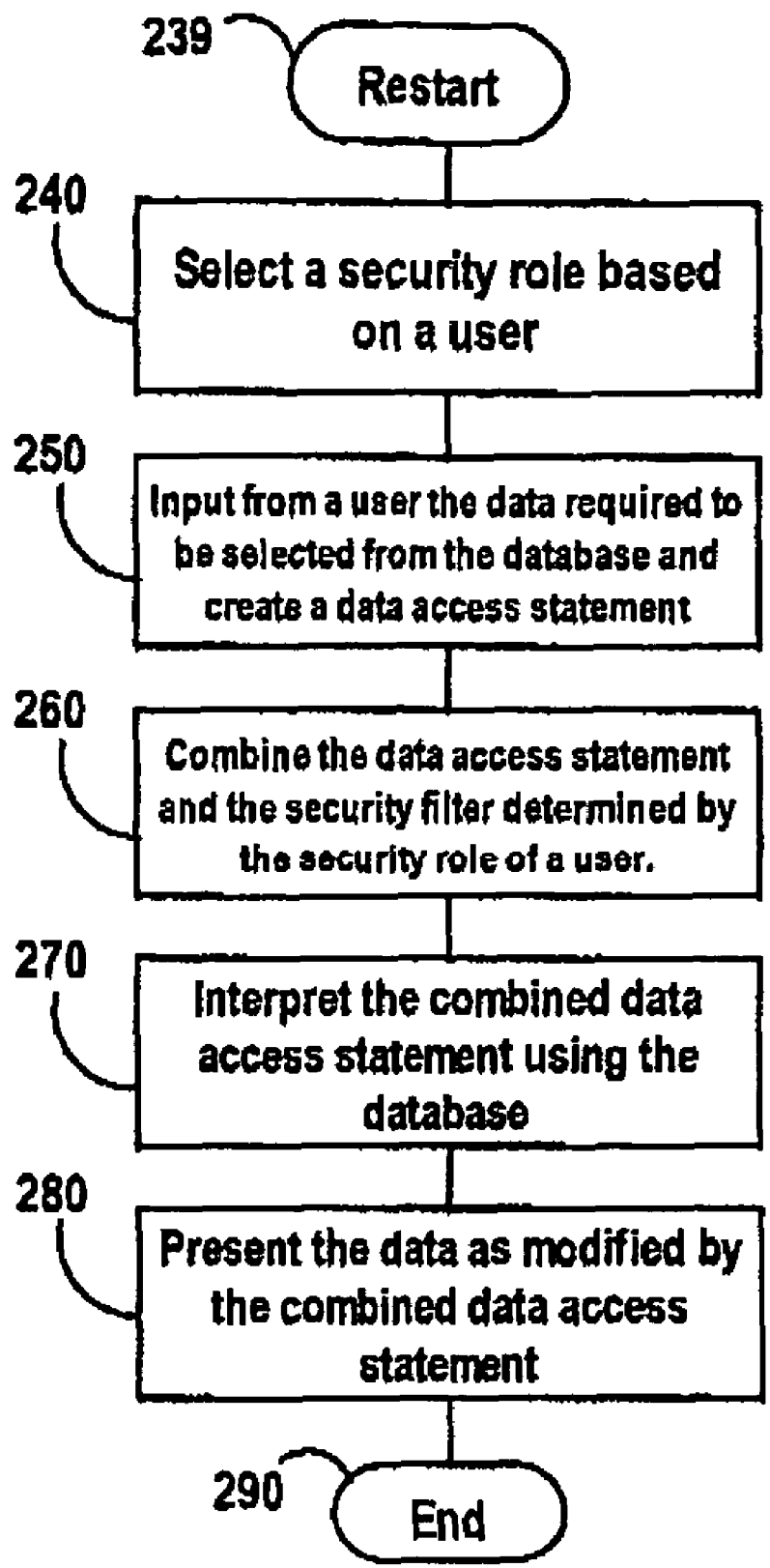
FIG. 4 shows an outline flowchart describing a second part of an embodiment of the invention.

Embodiments of the invention may conveniently be implemented on any general purpose computing platform, including one incorporated in a client/server or networked environment, such as that described with reference to FIG. 1 in which one or more client computers 410, 411 are connected over a network 400 to a server 420, itself connected to at least one database 430.

In a first embodiment of the invention, a set of security filters is associated with every query subject that must be secured. Each security filter is a map between a user group in a security database (a security group), and a filter expression that grants access to a subset of the rows in the full query subject. A set of one or more filter expressions is defined that determine the data to which the current user has access rights by virtue of memberships in corresponding security groups. Such access rights are known as the user's roles. At query time, the generated SQL query expression incorporates an appropriate set of security filters. The result is that the data produced by the query expression contains a union of the subsets of data that are accessible by each security group of which the report user is a member. This matches conventional security models.

In embodiments of the invention, every query subject that must be secured is associated with a set of one or more security filter objects. Each security filter object acts as or provides a map between a security group (or role) in a security database, and a filter expression that grants access to the appropriate subset of the rows in a query subject, which in turn is derived from one or more tables in an underlying database. The filters are extensions to, and external to, the underlying database, and are associated with that database. The security role of a user is expressed in the form of membership in the corresponding security groups. At query time, the generated SQL expression is modified to take into account the security feature.

In embodiments of the invention, this modification takes the form of appending to the data access language expression, using the AND operator, one or more security filters combined with the OR operator. The security filters therefore define the data to which the current user is permitted access by virtue of that user's security role. In other embodiments, different security filters appended to the data access language expression may be further combined using logical operations to permit more flexible and generalised overall security filtering.

The result is that the data produced by the query contains a union of the subsets of data that are accessible by each group of which the report consumer is a member. This matches conventional security models.

In some embodiments, this straightforward mode is extended by allowing each security filter to be based on a previously defined security filter. At query time, the resulting chain of dependent security filters is combined using logical operators. Thus, the data represented by this dependency chain is the intersection of the data represented by the individual filters in the chain. Development and defining of security applications is somewhat simplified since any of the security filters can be reused, typically by using them in different combinations and by the addition of new security filters that are combined with existing ones. In these embodiments, a high-level filter is first defined that describes a large data subset available to the union of all groups in question (e.g. country). The individual group filters then refine this with the specifics of each group (e.g. product lines), without having to re-describe the base subset.

Opportunities for re-use are further enhanced by allowing complex filters to be defined in a free-standing location, and then referring to the location as described earlier.

One embodiment of the invention is now described with reference to FIG. 3 and FIG. 4. Turning first to FIG. 3, in a first session, the process starts 200, one or more security roles are defined by a modeler (not shown) 210, and these security roles are associated with business intelligence data stored in the database 220. Next, one or more security filters are derived from the security roles and storing the one or more security filters 230 and the first session ends 231. Turning next to FIG. 4, a subsequent session starts 239 and one or more security roles are selected from those stored based on the user 240. A user defines a data access language statement 250, determining the information required to be selected from the database, and the stored security filters are combined with the data access language statement, using AND and OR functions, to produce a modified data access statement 260, to limit the data accessed by the data access statement in accordance with the previously selected security roles. The modified data access statement is used to access the data stored within the database 270 and finally the user is presented with business intelligence data accessed by the modified data access statement 280 before the subsequent session ends 290.

Figure 5:
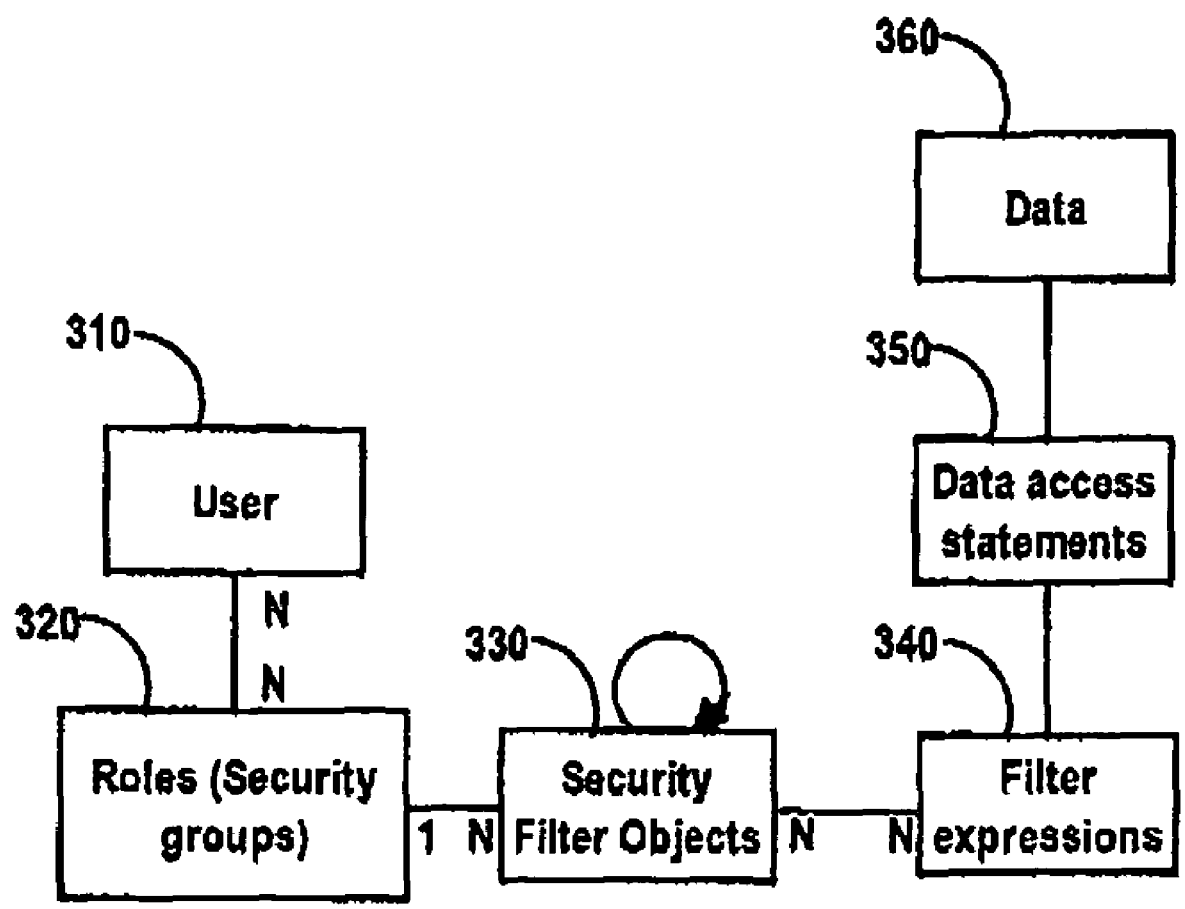
FIG. 5 shows relationships between various elements of the invention.

FIG. 5 shows the relationships between various entities used in embodiments of the invention. A user 310 may be a member of one or more security groups defined as roles 320, each of which is related to one or more security filter objects 330. The security filter objects 330 are associated with filter expressions 340 that are applied to data access statements 350 thereby restricting the data 360 selected for reports (not shown) for a particular user to those data applicable to that user's roles.

Those skilled in the art will recognise that the invention may be carried out with many variations, in particular using database access languages other that SQL, and databases or data warehouses that are not necessarily relational. It is our intention that all such variations be covered by the description in this application and the claims attached.

What is claimed is:

1. A method of providing restricted access to data contained in a business intelligence system using a database and having an application with user input, the method comprising:

defining one or more security roles;

defining one or more security filters associated with one or more query subjects of a relational database of business intelligence information that are to be secured by restricting access to the one or more query subjects, each of the security filters providing a mapping between at least one of the one or more security roles and a filter expression, expressed in a structured query language, that grants access to a subset of rows in the one or more query subjects;

selecting one or more user security roles from the one or more security roles and thereby selecting one or more user security filters from the one or more related security filters;

accepting user input defining an original data access language statement, expressed in the structured query language, to determine information required to be selected from the one or more query subjects of the database;

combining, by a computer, the one or more filter expressions of the one or more security filters with the original data access statement to produce a modified data access statement expressed in the structured query language, the modified data access statement limiting the requested information to the rows with access granted by the filter expressions mapped to the user security roles through the security filters;

accessing, by the computer, the data stored within the database by interpreting the modified data access statement; and presenting business intelligence data accessed by the modified data access statement.

2. The method of claim 1, further comprising storing the one or more security filters in a separate system.

3. The method of claim 1, further comprising combining information from a separate database with information from the business intelligence database to define the one or more security roles.

4. The method of claim 1, further comprising storing the business intelligence information in a plurality of relational databases.

5. The method of claim 1, wherein combining the one or more filter expressions of the one or more security filters with the original data access statement comprises:

combining the one or more filter expressions using OR functions; and combining the combined one or more filter expressions with the original data access statement using an AND function to provide a union of access rights of each of the one or more filter expressions associated with the one or more security roles.

6. The method of claim 1, further comprising constructing the one or more security filters to include a reference to a second security filter.

7. The method of claim 6, wherein the second security filter is reused.

8. A computer-readable medium comprising instructions for causing a computer to:

define one or more security roles; define one or more security filters associated with one or more query subjects of a relational database of business intelligence information that are to be secured by restricting access to the one or more query subjects, each of the one or more security filters providing a mapping between at least one of the one or more security roles and a filter expression, expressed in a structured query language, that grants access to a subset of rows in the one or more query subjects;

select one or more user security roles from the one or more security roles and thereby selecting one or more user security filters from the one or more related security filters;

accept user input defining an original data access language statement, expressed in the structured query language, to determine information required to be selected from the one or more query subjects of the database;

combine the one or more filter expressions of the one or more security filters with the original data access statement to produce a modified data access statement expressed in the structured query language, the modified data access statement limiting the requested information to the rows with access granted by the filter expressions mapped to the user security roles through the security filters;

access the data stored within the database by interpreting the modified data access statement; and present business intelligence data accessed by the modified data access statement.

\* \* \* \* \*